United States Patent [19] [11] 4,226,739
Cheng et al. [45] Oct. 7, 1980

[54] MAGNESIUM-CONTAINING DISPERSIONS BY DECOMPOSITION OF MGCO₃

[75] Inventors: William J. Cheng; David B. Guthrie, both of St. Louis, Mo.

[73] Assignee: Petrolite Corporation, St. Louis, Mo.

[21] Appl. No.: 885,150

[22] Filed: Mar. 10, 1978

[51] Int. Cl.² .................. C09K 3/00; C10L 10/04
[52] U.S. Cl. .................. 252/389 R; 44/51; 252/387; 252/25; 106/314
[58] Field of Search ........... 423/637; 44/51; 252/18, 252/25, 387, 389 R

[56] References Cited

U.S. PATENT DOCUMENTS 2,322,555  6/1945  Winding .................. 423/637
3,540,866  11/1970  Miller .................... 44/51

Primary Examiner—Winston A. Douglas
Assistant Examiner—J. V. Howard
Attorney, Agent, or Firm—Sidney B. Ring; Hyman F. Glass

[57] ABSTRACT

This invention relates to stable, fluid magnesium-containing dispersions and the preparations thereof by the high temperature decomposition of MgCO₃ to MgO in a dispersant-containing fluid.

5 Claims, No Drawings

MAGNESIUM-CONTAINING DISPERSIONS BY DECOMPOSITION OF MGCO3

Dispersions of magnesium-containing compounds have been heretofore prepared by various methods. One such method, which involves the reaction of Mg metal with an alcohol to form an intermediate magnesium alkoxide, is a complicated multi-stepped process. The following are illustrative:

U.S. Pat. Nos.—

2,570,058 2,582,254 2,593,314 2,692,239 2,788,325
2,834,662 2,895,913 2,939,808 3,018,172 3,150,089

Belgian Patent Nos.—

842,131
818,960

Ulric B. Bray, Charles R. Dickey and Vanderveer Voorhees Ind. Eng. Chem., Prod. Res. Dev., 14, 295-8 (1975).

Other processes employing already formed MgO, although not considered suitable by Bray, Dickey and Voorhees (loc. cit.), are illustrated by the following:

U.S. Pat. Nos.—

3,018,172 3,524,814 3,629,109 3,865,737 3,928,216

Belgian Patent No.—

817,035

Netherlands Application No.—

6,410,242

Ser. No. 816,626 filed July 18, 1977 relates to stable, fluid magnesium-containing dispersions, and the preparation thereof, by the high temperature dehydration of $Mg(OH)_2$ to MgO in a dispersant-containing fluid.

Ser. No. 840,192 filed Oct. 17, 1977 and Ser. No. 853,600 filed Nov. 21, 1977 relate to stable, fluid magnesium-containing dispersions, and the preparation thereof, by the high temperature decomposition of magnesium carboxylate such as magnesium acetate to MgO in a dispersant-containing fluid.

We have now discovered a facile method of preparing stable, fluid magnesium-containing dispersions which comprises heating $MgCO_3$ in the presence of a fluid of low volatility containing a dispersing agent soluble in said fluid to effect its decomposition into MgO and $CO_2$ at temperatures substantially lower than required when $MgCO_3$ in the dry state is decomposed into the aforesaid products.

The process, in essence, comprises an almost "explosive" decomposition of magnesium carbonate to magnesia according to the equation

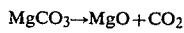
$$MgCO_3 \rightarrow MgO + CO_2$$

During this decomposition, $MgCO_3$ is disintegrated into minute particles of MgO which are immediately suspended and become stabilized in the fluid by the presence of a dispersing agent.

Any suitable magnesium carbonate capable of being subdivided upon decomposition into submicron particles of magnesia can be employed.

Any suitable non-volatile process fluid capable of being heated to the decomposition temperature of $MgCO_3$ can be employed. The process fluid should be relatively stable and relatively non-volatile at the decomposition temperature. However, any volatility encountered is readily controlled by refluxing and condensing apparatus.

Examples of such non-volatile process fluids are as follows: hydrocarbons (such as mineral oil, paraffin oil, or aromatic oil), diphenyl oxide fluids, silicone oils, polyglycol ethers or vegetable oils, etc., solely the dispersant, or any combinations thereof.

The non-volatile process fluid should contain a dispersant(s) capable of retaining the magnesium compound formed by decomposition in stable suspension. Any suitable dispersant which is relatively stable under the high temperature conditions of this invention can be employed.

These are illustrated by the following: saturated and unsaturated fatty acids (such as stearic acid and oleic acid) and derivatives thereof (such as sorbitan monooleate), sulfonic acids (such as mahogany or petroleum derived sulfonic acids and synthetic sulfonic acids), naphthenic acids, oxyalkylated fatty amines, alkylphenols, sulfurized alkylphenols, oxyalkylated alkylphenols, etc.

In the event that an above-mentioned organic carboxylic acid or sulfonic acid or any combination thereof is to be used as the dispersant, it is obvious that it is to react with a basic magnesium compound to form a salt or other complex. The magnesium salt or complex of such acid moiety is formed by the reaction of an equivalent of basic magnesium moiety (such as, for example, magnesium oxide, magnesium hydroxide, magnesium carbonate, or any mixtures thereof) with a corresponding equivalent of acid moiety.

Whereas the temperature for the decomposition of dry $MgCO_3$, which is not wet with any very high boiling fluid, evolves $CO_2$ primarily at 450°–600° C., the $CO_2$ liberated by this invention is removed from the reaction by its volatility at substantially lower temperatures.

In the practice of this invention, temperatures of about 250° to 450° C. are employed, such as from about 300° C. to 400° C., but preferably from about 320° C. to 380° C.

The particle size of the resulting MgO so formed in general should be of a size which is stable and fluid. In practice, the particle size is no greater than about 5 microns, such as no greater than about 2 microns, but preferably no greater than about one micron.

The concentration of the magnesium compound so formed in the non-volatile process fluid should be no greater than that concentration which maintains suitable fluidity. In general, the final concentration based on non-volatile fluid and other materials is from about 1% to 32% when calculated as percent magnesium, such as from about 2% to 29%, for example, from about 3% to 26%, but preferably from about 4% to 23%.

The concentration of the dispersant in the non-volatile process fluid should be sufficient to maintain a fluid, stable dispersion of magnesium oxide in the fluid. In general the weight concentrations of dispersant and non-volatile fluid may range from 100% dispersant and 0% non-volatile fluid to as little as 0.01% dispersant and 99.99% fluid, such as from about 95% and 5%, for example from about 90% to 10%, but preferably from about 85% to 15%.

Although we do not wish to be bound by actual theory, we believe that the formation of dispersible magnesium oxide results from the in situ formation of highly porous and sub-micron sized MgO at the instant $CO_2$ is liberated from MgCO₃ at its decomposition temperature. In such a form the resulting MgO is immediately dispersed and stabilized by the action of the dispersing agent. Prior art procedures do not prepare MgO dispersions by employing the high temperature decomposition of $MgCO_3$ directly in the dispersing fluid which is necessary for the product and process of this invention, and therefore, do not achieve a stable dispersible magnesium oxide but instead attempt to achieve magnesium dispersibility through other forms of magnesium compounds, particularly as carbonate as shown in U.S. Pat. No. 4,065,396. In addition, the prior art procedures are more complicated, more difficult to carry out, and less energy-efficient.

One high temperature process described in U.S. Pat. No. 3,055,829 involves the conversion of metal carboxylates to the metal carbonates.

U.S. Pat. No. 4,065,396 issued Dec. 27, 1977 relates to a process defined by claim 1 thereof.

Claim 1

"In the process of preparing a colloidal dispersion of magnesium carbonate in a lower alcohol of 1 to 4 carbon atoms by the simultaneous action of magnesium oxide and $CO_2$, the improvement comprising preparing the said magnesium oxide by roasting magnesium carbonate at a temperature of 800°–900° F. and cooling the resulting oxide in the absence of moisture, thereby producing an oxide having a crystal structure rendering it reactive with alcohol and $CO_2$, then contacting said oxide with said alcohol and $CO_2$ at a temperature of about 80° to 200° F. to form said colloidal dispersion."

Thus U.S. Pat. No. 4,065,396 is a multi-step process which:

(1) decomposes dry $MgCO_3$ to MgO,
(2) dissolves MgO in methanol,
(3) remakes $MgCO_3$ by reaction with $CO_2$ in methanol,
(4) removes the methanol,
(5) then places the product in the process oil.

This is a 5-step process in contrast to the present 1-step process.

The differences between U.S. Pat. No. 4,065,396 and the present invention are as follows:

| U.S. Pat. No. 4,065,396 | Present Invention |
|---|---|
| (1) Dry decomposition (at preferred temp. of 800°–900° F.) | Decomposition in Fluid in which it is employed at 320°–380° C. (608°–716° F.) |
| (2) 5-step process | 1-step process |
| (3) Requires filtration; example has 4% undispersed MgO solids | No filtration required; little, if any, undispersed solids (about 0.1% or less by volume) |
| (4) Overbased value 6.6/1 | Overbased value 8.1/1, 25% higher |
| (5) Final product MgCO₃ dispersion | Final product MgO dispersion |

The following example is presented for purposes of illustration and not of limitation.

EXAMPLE

To a 1-liter glass reaction flask were charged 210 g of a high-boiling hydrocarbon oil, 39.5 g of naphthenic acid (about 0.103 equivalent), and 3.0 g of $Mg(OH)_2$ (0.103 equivalent). The contents were stirred and heated to about 225° C. under reflux to form a magnesium naphthenate and by-product water. The mass was cooled to 150° C. and 35.5 g of magnesium carbonate (0.842 equivalent) were added. The contents were stirred and heated to about 320° C. by which temperature the water of neutralization had been removed and decomposition of the magnesium carbonate commenced as observed by the explosive sputterings and entrainment of hydrocarbon oil as carbon dioxide was evolved. The heating of the contents was continued up to 380° C. and was held there until no further decomposition was observed. The reaction mass was cooled, and weighed 249.2 g. The contents were centrifuged for two hours and the amount of undispersed solids was only 0.1% by volume. The calculation for both oil soluble and oil dispersed magnesium content is 4.61% as Mg. The ratio of equivalents of total metal as Mg to equivalents of acid dispersant is 9.17/1; the overbased value is 8.17/1 or 817%.

The MgO dispersions of this invention can be further reacted to form dispersions of the corresponding derivatives. For example, after decomposition in accord with this invention, the MgO dispersions can be further reacted with $CO_2$ to form $MgCO_3$ dispersions, reacted with $H_2O$ to form $Mg(OH)_2$ dispersions, etc. The compositions of this invention have a wide variety of uses. The following are illustrative:

1. As a combination anti-corrosion and acidic neutralization additive for lubricating oils and greases,
2. As a combination anti-corrosion and acidic neutralization additive during the combustion of fuels such as residual fuel, pulverized sulfur-containing coal, or mixtures thereof,
3. As a combination anti-weathering and sealing agent for water-proofing cement, concrete, and asphaltic surfaces,
4. In proprietary pharmaceutical and cosmetic formulations,
5. As corrosion inhibitors, particularly in fuels containing vanadium.

USE A CORROSION INHIBITOR FOR VANADIUM-CONTAINING FUELS

The demand for greatly increased amounts of energy has forced utilities and other large-quantity users of fossil fuels to explore low-quality fuels for use in steam boilers and gas turbines. Fuels such as unrefined crude oil and residual oil contain large amounts of impurities which result in corrosive deposits in the equipment. Two of these impurities, sodium and vanadium, form catastrophically corrosive, low melting slags that can destroy a vital part in a matter of hours.

Crude oil usually contains 1–500 ppm of vanadium in the form of a porphyrin complex depending on the source. Because of its origin as a concentrate from the refining process, residual oil contains several times more vanadium than the crude from which it was derived. The combustion of these vanadium-containing fuels produces very corrosive $V_2O_5$ deposits which can destroy a turbine part in a matter of hours. Although the vanadium can be removed, the cost of the process cancels the economic advantage of using unrefined fuels. Vanadic corrosion is, therefore, usually controlled with chemical additives and optimization of operating conditions.

Sodium is almost always present in low-quality fuels, either directly in the crude oil or indirectly through contamination from various sources. The technology for removing sodium is well developed. These are limiting processes, however, and a trace of sodium must always be dealt with. For example, in maritime use the sodium level can be increased because of the introduction of sodium chloride through the air intake and contamination of the fuel by sea water. During combustion, the sodium reacts with the sulfur in the fuel to form the sulfate which is deposited in turbine parts. This reaction has been shown to be thermodynamically favored and results in the only sodium compound that will deposit under these conditions.

The mechanism of corrosion by vanadium and sodium has received much attention. Nascent oxygen species has been proposed as the corrosive active agent in $V_2O_5$ melts. Various mechanisms have been presented to explain corrosive attack by sodium sulfate at metal surfaces. The classical method of inhibiting the corrosive characteristics of $V_2O_5$ and $Na_2SO_4$ melts has been to form high-melting vanadates of the former and minimize the level of the latter. Magnesium has been the most successful substance for this type of protection. The optimum levels of magnesium addition are not precisely known. Just as the mechanism of corrosion is only partially understood, so too is that of its inhibition.

There are other methods of limiting the corrosion such as reducing the operating temperature and maintaining the air to fuel ratio so that slightly reducing conditions exist during combustion. These types of methods may not be applicable. For example, the air to fuel ratio cannot be lowered to obtain reducing conditions in a gas turbine. Lower operating temperatures make the system less efficient and may be ruled out for economic reasons. Thus, chemical additives are often the best way to inhibit corrosion.

The compositions of this invention inhibit fireside corrosion in gas turbines, steam boilers and furnaces when incorporated into petroleum fuels in minor but effective amounts such as from about 1 to 2000 ppm, for example from 1 to 1000 ppm, but preferably from about 1 to 100 ppm, based on magnesium content.

USE AS ADDITIVES FOR AUTOMOTIVE AND INDUSTRIAL LUBRICANTS

A chemical additive in the usual sense refers to a material which enhances a desirable property while eliminating or minimizing one or more undesirable ones. Since about 1930 the commercial application of chemical additives to lubricating oils has kept pace with the increasing demands of modern machinery, such as automotive engines, high-speed machinery, high-pressure hydraulic control systems, etc. The literature and patent art are replete with examples of such additives which in general improve the lubrication performance for the machinery while mimimizing the frequency of maintenance.

For combating the severe rust conditions which may be encountered during shipping of machinery or in long storage or exposure to out-door weather, sodium and calcium sulfonate additives are commonly used.

Additives for imparting detergency to lubricating oils are widely used at 2–20% concentration and are found to prevent or remove deposits of oil-insoluble sludge, varnish, carbon and lead compounds which otherwise form on internal combustion engine parts. The additives probably act by adsorbing and suspending the insoluble particles to that deposits are minimized, and cleanliness of rings, valves, and cylinder walls are maintained. Commercial detergent additive for such automotive and diesel engine oils are designed also to react chemically with the highly acidic by-products of combustion that find their way into the lubricating oil system. The additives with this type of functionality are usually comprised of basic barium, calcium, and magnesium salts of oil-soluble organic compounds.

A discussion of the preparation and use of overbased or hyperbasic detergent sulfonates is found in U.S. Pat. No. 3,057,896. The term "metal ratio," as used to describe the amount of overbasing or hyperbasic detergency in the additive, is defined as the ratio of equivalents of metal to equivalents of organic acid. The important metals which readily provide such overbasing are those of the alkaline earth group particularly magnesium, calcium and barium.

The products of this invention at a metal ratio of about 9/1 such as the product described in the Example can be employed as hyperbasic additives for lubricating oils.

We claim:

1. A process of preparing a stable, fluid magnesium-containing dispersion which comprises thermally decomposing $MgCO_3$ to $MgO$ in a process fluid which is stable and non-volatile and capable of being heated to the decomposition temperature of the magnesium carbonate in the fluid, and which contains a dispersant capable of retaining the magnesium oxide as it is formed by the thermal decomposition in stable suspension.

2. The process of claim 1 where the decomposition temperature is about 250° C. to 450° C.

3. The process of claim 2 where the decomposition temperature is 320° to 380° C.

4. The process of claim 3 where the process fluid is a high boiling hydrocarbon oil and the dispersant is magnesium naphtenate.

5. The product of the process of claim 4.

* * * * *